United States Patent
Stark et al.

(10) Patent No.: US 8,007,758 B2
(45) Date of Patent: Aug. 30, 2011

(54) METAL DELIVERY SYSTEM FOR NANOPARTICLE MANUFACTURE

(75) Inventors: Jan Wendelin Stark, Winterthur (CH); Sotiris E. Pratsinis, Zürich (CH)

(73) Assignee: ETH Zurich, Zürich (CH)

( * ) Notice: Subject to any disclaimer, the term of this patent is extended or adjusted under 35 U.S.C. 154(b) by 422 days.

(21) Appl. No.: 10/557,399

(22) PCT Filed: May 20, 2003

(86) PCT No.: PCT/IB03/02010
§ 371 (c)(1),
(2), (4) Date: Nov. 18, 2005

(87) PCT Pub. No.: WO2004/103900
PCT Pub. Date: Dec. 2, 2004

(65) Prior Publication Data
US 2006/0229197 A1    Oct. 12, 2006

(51) Int. Cl.
*C01B 13/14* (2006.01)
*C01B 13/00* (2006.01)
*C01C 1/00* (2006.01)
*C01D 1/02* (2006.01)
*C01G 25/02* (2006.01)

(52) U.S. Cl. .......... 423/592.1; 423/593.1; 423/608; 977/773; 977/775; 977/776; 427/453

(58) Field of Classification Search .......... 423/263, 423/592.1, 593, 278, 335, 624, 618, 619, 423/608, 609, 610, 635, 641, 593.1; 502/300–355; 427/446–456; 977/773, 775, 776
See application file for complete search history.

(56) References Cited

U.S. PATENT DOCUMENTS

| | | | |
|---|---|---|---|
| 3,900,331 A | 8/1975 | Cassidy | |
| 4,501,823 A | 2/1985 | Masuda | |
| 4,659,617 A | 4/1987 | Fujii et al. | |
| 4,711,769 A | 12/1987 | Inoue et al. | |
| 4,772,736 A * | 9/1988 | Edwards et al. | 556/179 |
| 4,855,118 A | 8/1989 | Ichinose et al. | |
| 5,276,251 A | 1/1994 | Kamei et al. | |
| 5,395,606 A * | 3/1995 | Xiao et al. | 423/411 |

(Continued)

FOREIGN PATENT DOCUMENTS
EP    0803471    10/1997
(Continued)

OTHER PUBLICATIONS

Pratsinis, Sotiris E., "Flame Aerosol Synthesis of Ceramic Powders," Prog. Energy Combust. Sci. vol. 24, pp. 197-219, 1998.*
(Continued)

*Primary Examiner* — Stanley Silverman
*Assistant Examiner* — Anthony J Zimmer
(74) *Attorney, Agent, or Firm* — Cooper & Dunham LLP

(57) ABSTRACT

Described is a method for the production of pure or mixed metal oxides, wherein at least one metal precursor that is a metal carboxylate with a mean carbon value per carboxylate group of at least 3, e.g. the 2-ethyl hexanoic acid salt, is formed into droplets and e.g. flame oxidized. The method is performed at viscosities prior to droplet formation of usually less than 40 mPa s, obtained by heating and/or addition of one or more low viscosity solvents with adequately high enthalpy.

15 Claims, 7 Drawing Sheets

U.S. PATENT DOCUMENTS

| | | | | |
|---|---|---|---|---|
| 5,514,822 | A | * | 5/1996 | Scott et al. ............... 556/28 |
| 5,958,361 | A | * | 9/1999 | Laine et al. ............ 423/610 |
| 5,984,997 | A | * | 11/1999 | Bickmore et al. ......... 75/343 |
| 5,989,514 | A | | 11/1999 | Bi et al. |
| 6,013,318 | A | * | 1/2000 | Hunt et al. ............ 427/248.1 |
| 6,030,914 | A | | 2/2000 | Matsui |
| 6,887,566 | B1 | | 5/2005 | Hung et al. |
| 7,052,777 | B2 | * | 5/2006 | Brotzman et al. ......... 428/570 |
| 7,211,236 | B2 | | 5/2007 | Stark et al. |
| 7,220,398 | B2 | | 5/2007 | Sutorik et al. |
| 7,229,600 | B2 | * | 6/2007 | Yadav ............... 423/263 |
| 2003/0101659 | A1 | | 6/2003 | Katusic et al. |
| 2004/0050207 | A1 | | 3/2004 | Wooldridge et al. |
| 2004/0126298 | A1 | | 7/2004 | Stark et al. |
| 2005/0227864 | A1 | * | 10/2005 | Sutorik et al. ......... 502/304 |
| 2006/0229197 | A1 | | 10/2006 | Stark et al. |
| 2007/0196259 | A1 | | 8/2007 | Stark et al. |

FOREIGN PATENT DOCUMENTS

| | | |
|---|---|---|
| EP | 0841304 | 5/1998 |
| EP | 0841304 A1 | 5/1998 |
| EP | 1142830 | 10/2001 |
| EP | 1 378 489 | 1/2004 |
| JP | 2001-146584 | 6/1997 |
| JP | 2001-039716 | 2/2001 |
| JP | 2001-287152 | 10/2001 |
| JP | 2003-139869 | 5/2003 |
| WO | WO 0027754 | 5/2000 |
| WO | WO 01/36332 A1 | 5/2001 |
| WO | WO 0136332 | 5/2001 |
| WO | WO 03/070640 A1 | 8/2003 |
| WO | WO 03070640 | 8/2003 |
| WO | WO 2004/103900 | 12/2004 |
| WO | WO 2005/087660 | 9/2005 |

OTHER PUBLICATIONS

Mädler et al., "Controlled synthesis of nanostructured particles by flame spray pyrolysis," Aerosol Science 33 (2002) 369-389.*
Kim et al., "Synthesis of Nanoporous Metal Oxide Particles by a New Inorganic Matrix Spray Pyrolysis Method", Chem. Mater. 2002, 14, 2889-2899.*
Messing et al. "Ceramic Powder Synthesis by Spray Pyrolysis", Journal of the American Ceramic Society 76 (11) 2707-26 (1993).*
Shoichi Fujiwara et al., Chemical Abstract Service, Columbus, Ohio, US; "Preparation of superconducting YBCO thick films by spray-pyrolysis of organic acid salts", Jun. 13, 1992, XP002264388.
W.J. Stark et al., Chemical Communications, "Flame synthesis of nanocrystalline ceria-zirconia: effect of carrier liquid"; No. 5, Feb. 20, 2003, pp. 588-589, XP002264387.
Fujiwara et al. "Preparation of superconducting YBCO films by spray-pyrolysis of organic acid salts" Chemical Abstracts Service, abstract (1992).
Stark et al."Flame synthesis of nanocrystalline ceria-zirconia: effect of carrier liquid" Chemical Communications, No. 5 Feb. 20, 2003.
L. Madler et al. (2002) "Flame-made ceria nanoparticles", J. Mater, Res., vol. 17, No. 6, pp. 1356-1362.
A.R. DiGiampaolo et al., "Corrosion Behavior of Aerosol Thermal Sprayed ZrO2 Coatings" Advanced Performance Materials 6, 39-51, (1999) Kluwer Academic Publishers. Manufactured in The Netherlands. (abstract).
L. Madler et al. (2002) "Bismuth Oxide Nanoparticles by Flame Spray Pyrolysis", J. Am. Ceram. Soc., vol. 85, No. 7, pp. 1713-1718.
S.T. Aruna et al. (1998) "Combustion Synthesis and Properties of Nanostructured Ceria-Zirconia Solid Solutions", vol. 10, No. 6, pp. 955-964.
Jarcho, M. (1981) "Calcium-Phosphate Ceramics as Hard Tissue Prosthetics." Clin. Orthapaedics and Related Research, 259-278.
de Groot, K. (1983) "Bioceramics of Calcium Phosphate" (ed. de Groot, K.) (CRC Press, Boca Raton).
LeGeros, R. Z. (1991) "Calcium Phosphates in Oral Biology and Medicine" (ed. LeGeros, R.Z.) (S. Karger, Basel).
Metsger, D.S. et al. (1982) "Tricalcium Phosphate Ceramic—a Resorbable Bone Implant—Review and Current Status", Journal of the Am. Dental Assoc. 105, 1035-1038.
LeGeros, R. Z. et al. (1995) "Encyclopedic Handbook of Biomaterials and Bioengineering" eds. Wise, D.L., J., T.D., & E., A.D., (Marcel Dekker, New York).
Dong, Z. L. et al. (2003) "TEM and STEM analysis on heat-treated and in vitro plasma-sprayed hydroxyapatite/Ti-6A1-4V composite coatings" Biomaterials 24, 97-105.
Cleries, L. et al. (1998) "Dissolution behaviour of calcium phosphate coatings obtained by laser ablation" Biomaterials 19, 1483-1487.
Arias, J. L. et al. (2003) "Micro- and nano-testing of calcium phosphate coatings produced by pulsed laser deposition." Biomaterials 24, 3403-3408.
Tadic, D. et al. (2002) "Continuous synthesis of amorphous carbonated apatites" Biomaterials 23, 2553-2559.
Sarkar, M. R. et al. (2001) "First histological observations . . . a novel calcium phosphate bone substitute material in human cancellous bone" Jour. of Bio. Mat. Res. 58, 329-334.
Overgaard, S. et al. (1999) "The influence of cyrstallinity of the hydroxyapatite coating on the fixation of implants . . ." Jour. of Bone & Joint Surg.-Brit. vol. 81B, 725-731.
Knaack, D. et al. (1998) "Resorbable calcium phosphate bone substitute" Journal of Biomedical Materials Research, 43, 399-409.
Stark, W. J. et al. (2002) "Flame-made titania/silica epoxidation catalysts: Toward large-scale production" Indus. & Engin. Chem. Res. 41, 4921-4927.
W. J. Stark, et al. (2002) Aerosol flame reactors for manufacture of nanoparticles. Powder Technol., 126, 103-108.
Ravaglioli, A. & Krajewski, A. (1992) "Bioceramics: Materials, Properties, Applications" p. 432, Chapman & Hall, London.
Gauthier, O. et al. (1998) "Macroporous biphasic calcium phosphate ceramics: influence of macropore diameter & macroporosity percentage on bone ingrowth" Biomat. 19, 133-139.
Weiss, P. et al. (2003) "Synchrotron X-ray microtomogrophy . . . provides 3-D imaging representation of bone ingrowth in calcium phosphate biomaterials" Biomat. 24, 4591-4601.
Yuan, H. P. et al. (1998) "Osteoinduction by calcium phosphate biomaterials" Journal of Materials Science-Materials in Medicine 9, 723-726.
Bignon, A. et al. (2003) "Effect of micro & macroporosity of bone substitutes on their mechanical properties & cellular response" Jou. of Mat. Sci-Mat. in Med. 14, 1089-1097.
Yuan, H. P. et al. (2001) "Bone formation induced by calcium . . . in soft tissue of dogs: a cpmarative study b/w porous alpha-TCP & beta-TCP" Jou of Mat. Sci-Mat in Med. 12, 7-13.
Yuan, H. P. et al. (2002) "A comparison of the osteoinductive potential of 2 calcium phosph. ceramics implanted intramusc. in goats" Jou. of Mat. Sci-Mat in Med. 13, 1271-1275.
Yuan, H. P. et al. (2000) "Tissue responses of calcium phosphate cement: a study in dogs" Biomaterials 21, 1283-1290.
Yuan, H. P. et al. (1999) "A preliminary study on osteoinduction of two kinds of calcium phosphate ceramics" Biomaterials 20, 1799-1806.
Somrani, S. et al. (2003) "Thermal evolution of amorphous tricalcium phosphate" Journal of Materials Chemistry 13, 888-892.
Peters, F. et al (2000) "The structure of bone studied with synchrotron X-ray diffraction, X-ray absorption spectorscopy and thermal analysis" Thermachimica Acta 361, 131-138.
Suchanek, W. et al (2002) "Mechanochemical-hydrothermal synthesis of carbonated apattie powders at room temprature" Biomaterials 23, 699-710.
Baxter, J. D. et al. (1966) "Physical State of Bone Carbonate—a Comparative Infra-Red Study in Several Mineralized Tissues" Yale Journal of Biology & Medicine 38, 456.
Emerson, W. H. et al. (1962) "The Infra-Red Absorption Spectra of Carbonate in Calcified Tissues" Archives of Oral Biology 7, 671-683.
Fowler, B. O. "Infrared Studies of Apatites .1. Vibrational Assignment for Calcium, Strontium & Barium Hydroxyapatites Utilizing Isotopic Substitution" Inorg.Chem. 13, 194-207.
Jillavenkatesa, A. et al. (1998) "The infrared & Raman spectra of beta and alpha-tricalcium phosphate (Ca-3(PO4)(2))" Spectroscopy Letters 31, 1619-1634.
Dorozhkin, S. V. et al. (2002) "Biological & medical significance of calcium phosphates" Angewandte Chemie-International Edition 41, 3130-3146.

Daculsi, G. et al (1997) "Adaptive Crystal Formation . . . " International Review of Cytology—a Survey of Cell Biology vol. 172, 129-191, Academic Press Inc, San Diego.

Fulmer, M. T. et al. (2002) "Measurements of solubilities and dissolution rates of several hydroxyapatites" Biomaterials 23, 751-755.

Nelson, D. G. A. (1981) "The Influence of Carbonate on the Atomic-Structure and Reactivity of Hydroxyapatite" Journal of Dental Research 60, 1621-1629.

Cornilsen, B. C. et al. (1979) "Vibrational-Spectra of Beta-Ca2p2o7 and Gamma-Ca2p2o7" Journal of Inorganic & Nuclear Chemistry 41, 602-605.

Dewaal, D. et al. (1994) "Vibrational-Spectra of a Solid-Solution of Cadmium and Calcium Pyrophosphate" Materials Research Bulletin 29, 1129-1135.

Hezel, A. et al. (1967) "Vibrational Spectra of Some Divalent Metal Pyrophsophates" SPectrochimica Acta Part a-Molecular Spectroscopy A 23, 1583.

Pena, J. et al. (2003) "Hydroxyapatite, tricalcium phosphate and biphasic materials prepared by a liquid mix technique" Journal of the European Ceramic Society 23, 1687-1696.

Rigby, S. P. et al. (2004) "Characterisation of porous solids using integrated nitrogen sorption and mercury porosimetry" Chemical Engineering Science 59(1): 41-51.

Laine, R. M., et al. (2000) "Low Cost Nanopowders for Phosphor and Laser Applications by Flame Spray Pyrolysis", J. Metastable 5 Nanocryst. Mat., 2000, 8, 500.

Laine, R. M., at al. (1999) "Making nanosized oxide powders from precursors by flame spray pyrolysis", Key. Eng. Mat., 1999, 159, 17.

Yoshioka, T., et al. (1992) "Preparation of spherical ceria-doped tetragonal zirconia by the spray pyrolysis method", J. Mater. Sci. Lett., 1992, 11, 51.

Oljaca, M., et al. (2002) "Flame Synthesis of nanopowders 20 via combustion chemical vapor deposition", J. Mater. Sci. Lett., 21, 621-626.

Maric, R., et al. (2003) "Electrolyte Materials for Intermediate Temperature Fuel Cells Produced via Combustion . . . ", Electrochemical and Solid State Letters, 6 (5) A 91.

T. Tani, et al. (2002) "Synthesis of zinc oxide/silica composite nanoparticles by flame spray pyrolysis", Journal of Materials Science, vol. 32:4627-4632.

Takao Tani, et al. (2002) "Homogeneous ZnO nanoparticles by flame spray pyrolysis", Journal of Nanoparticale Research, vol. 4:337-343.

International Preliminary Report on Patentability for International Application No. PCT/CH04/000151, issued Sep. 19, 2006.

Jan. 2, 2009 Office Action issued from the U.S. Patent and Trademark Office in connection with U.S. Appl. No. 10/592,913.

May 20, 2009 Office Action issued from the U.S. Patent and Trademark Office in connection with U.S. Appl. No. 10/592,913.

Dec. 21, 2009 Office Action issued from the U.S. Patent and Trademark Office in connection with U.S. Appl. No. 10/592,913.

May 7, 2010 Advisory Action issued from the U.S. Patent and Trademark Office in connection with U.S. Appl. No. 10/592,913.

Mar. 15, 2010 Advisory Action issued from the U.S. Patent and Trademark Office in connection with U.S. Appl. No. 10/592,913.

Jan. 5, 2006 Office Action issued from the U.S. Patent and Trademark Office in connection with U.S. Appl. No. 10/602,305.

Feb. 22, 2006 Office Action issued from the U.S. Patent and Trademark Office in connection with U.S. Appl. No. 10/602,305.

Sep. 15, 2006 Notice of Allowability issued from the U.S. Patent and Trademark Office in connection with U.S. Appl. No. 10/602,305.

Jan. 31, 2007 Notice of Allowability issued from the U.S. Patent and Trademark Office in connection with U.S. Appl. No. 10/602,305.

German language translation of May 13, 2009 Official Action issued in a counterpart Japanese application in connection with U.S. Appl. No. 10/557,399.

German language translation of Dec. 11, 2009 Official Action issued in a counterpart Japanese application in connection with U.S. Appl. No. 10/557,399.

English language translation of Jun. 17, 2010 Official Action issued in Japanese Patent Application No. 2007-503170.

Japanese Patent Application Publication No. 62-256707, published Nov. 9, 1987, including Abstract in English and partial translation of the specification.

A.R. DiGiampaolo et al., "ZrO2 coatings on stainless steel by aerosol thermal spraying", Advances in Technology Materials and Materials Processing Journal (1998), 1(1), 90-100 (abstract).

S.T. Aruna et al. (1998) "Combustion Synthesis and Properties of Nanostructured Ceria-Zirconia Solid Solutions", vol. 10, No. 6, pp. 995-964.

U.S. Appl. No. 10/592,913, filed Nov. 13, 2006.

* cited by examiner

METAL DELIVERY SYSTEM FOR NANOPARTICLE MANUFACTURE

TECHNICAL FIELD

The present invention concerns a specific type of manufacturing method for metal oxides and metal oxides with specific features that are obtainable by said method, in particular cerium, zirconium, gadolinium, iron, manganese oxides, mixed oxides, in particular earth alkaline titanates, alkali manganates, stabilized zirconia and ceria.

BACKGROUND ART

Metal oxides, in particular mixed metal oxides have a broad range of applications such as e.g. ceramics, polymer additives, fillers, pigments, reactive surfaces, catalysts, storage materials, polishing additives, membranes, fuel cells etc. Among the most important metal oxides are cerium oxide, cerium-zirconium and other stabilized zirconia mixed oxides, titanates and other mixed oxides below referred to as ceramic oxides. If these materials are used as nanoparticles (particle diameter below 200 nm), they exhibit advantageous properties such as high catalytic activity, improved processing capability, low sintering temperature, good dispersion capability, just to name a few. Titanates are used as dielectics for capacitors. Nanoparticles are of high interest as reduced feature size requires thinner sheets of dialectics and since such thinner sheets are preferable made from very small particles, for example, nanoparticles.

Current methods for the production of metal oxides are mechanical and mechanical/thermal processes, wet-phase chemistry based methods, and high temperature methods such as flame spray pyrolysis (FSP). For the latter, energy to drive the conversion to nanosized oxides can be radiofrequency (plasma), microwaves, laser or shock waves. Most convenient, however, is the use of thermal energy since in most cases this is the least expensive source of energy.

Mechanical and mechanical/thermal methods are energy intensive (milling!) and generally suffer from insufficient mixing at the atomic level leading to low phase stability and/or low specific surface area. Impurity from the milling (abrasion) reduces product purity and performance.

Wet-phase based methods entail huge solvent costs, produce large amounts of waste water and need calcination steps after the synthesis, making them cost intensive. Furthermore, although e.g co-precipitation of ceria/zirconia can lead to mixed oxide powders with extremely high specific surface areas, unfortunately, the temperature stability of as-prepared oxides is characterized by a big loss of specific surface area at elevated temperature. The same observation applies for most wet-phase made ceramics. Preparation at high temperature may produce an oxide with increased stability. This has prompted several people to attempt to prepare oxides by flame spray based methods. Flame spray pyrolysis (FSP) is a known process and has been used for preparation of many oxides. It uses thermal energy and has the inherent advantage of supplying low cost energy to drive nanoparticle formation. However, in the case of many oxides, the research for suitable precursors entails huge problems associated with the chemical properties of these compounds. For example Yoshioka et al. (1992) used FSP for the production of ceria oxides, but they received a powder of low specific surface area. WO 01/36332 discloses a FSP method leading to an inhomogeneous product comprising ceria particles of broadly varying sizes. Aruna et al. (1998) investigated the ceria/zirconia synthesis by combusting mixtures of redox compounds and oxidizing metal precursors. This high temperature preparation yielded a high surface area product with apparently good phase mixing in as-prepared powders. However, the preparation of ceramics by solid combustion is difficult to realize at high production rates, since the process may quickly run out of control. Furthermore it is basically a batch process and the reproducibility is a general problem. Laine et al. (1999) and Laine et al. (2000) used a spray pyrolysis unit to prepare ceramic oxides but the specific surface area of the product powder stayed low, at 10 to 16 $m^2/g$. EP 1 142 830 also discloses a FSP method for the preparation of ceria/zirconia starting from organometallic compounds in organic solvents and/or water. The procedure disclosed in EP 1 142 830 focuses on chlorine free powders produced by flame spray pyrolysis and uses precursor solutions of type MeR where R is an organic rest such as methyl, ethyl, or a corresponding alkoxy-rest or a nitrate anion. As solvents, water or alcohols are used. U.S. Pat. No. 5,997,956 discloses a procedure where a liquid or liquid like fluid near its supercritical temperature is injected in a flame or plasma torch and thereby converted to nanoparticles.

WO 02/061163 A2 discloses an apparatus for the production of powders or film coatings. Thereby, the metal containing liquid is atomized without the use of a dispersion gas. Oljaca et al. (2002) describe a process using similar nozzles for the manufacture of nanoparticles. They only describe very low production rates with solutions being less than 0.05 M in metal. Droplet size distribution is stated as a major parameter for the successful nanoparticle synthesis. They report on the synthesis of yttria stabilized zirconia amongst others.

Recently Mädler et al. (2002B) disclosed an FSP method for the production of pure ceria with high surface and homogeneous particle sizes using a two phase nozzle to disperse the metal containing liquid by a dispersion gas (oxygen or air) and igniting the resulting spray by a premixed falame surrounding said nozzle. Such burner is furtheron in this document termed a spray burner. The solvent system used by Mädler et al., however, has now been found to be unsuitable for the production of e.g. ceria/zirconia. Stark et al. (2003) disclose the use of acetic acid and lauric acid for the preparation of ceria, zirconia and ceria/zirconia. Maric et al. (2003) use a not further specified CxH2zCeO6 precursor for the preparation of ceria, gadolinia and samaria doped ceria for fuel cell membranes. They applied a dispersion gas free atomization device working at low production rate and using a Nanomiser device (WO 02/061163 A2, see above) that makes very small droplets (below 10 micrometer). Overall production rate even using such a multiple nozzle setup is still below 1 kg/h.

In order to bring the nanoparticle manufacture from the pilot-scale production to an industrial scale synthesis (kg to ton quantities), some additional problems are to be faced. The most prominent is the choice of readily accessible metal precursors that allow sufficiently high production rates. The present invention links the manufacture of nanoparticles to existing metal containing products that were developed for different applications but not the manufacturing of nanoparticles. A second problem is production rate. Using multiple arrays as in WO 02/061163 A2 entails problems with maintenance, nozzle clogging, space, reproducibility and others. It would be much preferred to use few burners to make the same quantity of powder. It would further be of much use to apply a metal carrier liquid that can be sprayed on most conventional oil burners and does not require the sophisticated atomisation devices as e.g. in WO 02/061163. This further much helps scaling the production further up as oil burners with well above 100 kg oil/h are available. As it will become apparent within this invention, such a burner could achieve up to 20 kg ceramic particles per h (for 100 kg feed/hour).

For e.g. ceria, zirconia and ceria/zirconia all hitherto known methods use dilute metal solutions (usually <0.15 moles of metal/liter) resulting in low production rates. High metal concentrations are favorable as they directly increase the production rate of the process. Therefore, the metal concentration in the carrier liquid should be as high as possible. In the scope of the present invention, the flame spray process was found to limit the range of possible carrier liquid formulations by the viscosity as the liquid has to be dispersed during the process. While droplet size was found to be of minor importance, very viscous liquids could not be sprayed at all. It is therefore of high interest to find precursors for flame spray synthesis of oxide and metal nanoparticles that combine low viscosity and high metal concentration. Furthermore, such formulations should be readily produced and be stable upon storage. It is yet another objective of the present invention to show that common oil burners can be used for the synthesis of nanoparticles if the metal carrier liquid exhibits the above mentioned characteristics.

DISCLOSURE OF INVENTION

Hence, it is a general object of the invention to provide a method suitable for the production of metal oxides with improved features and therefore extended applications as well as such metal oxides.

Another object of the present invention is a ceria, zirconia, stabilized zirconia, iron or manganese oxide, lithium manganate or calcium- and barium-titanate nanopowder with high homogeneity and produced at high production rate.

Still other objects of the present invention are the use of a metal oxide of the present invention as at least part of a catalytically active system, in particular for combustion engines, or for mechanochemical polishing, or in magnets, in electronic components, mechanical actuators, as piezoelectric or energy storage elements.

It is yet another objective of the present invention to stabilize zirconia by adding another metal oxide such as ceria, gadolinia or yttria for applications in fuel cells, sensors and as structural ceramic or for coatings.

It is again another objective to show that common oil burners can be used for the synthesis of nanoparticles if metal containing liquids of specific quality are applied.

It is another objective that technical metal formulations are well suited for nanoparticle synthesis. While impurities are reducing the thermal stability, such particles may still be of high interest for high-volume applications where purity is of minor importance. Such applications may be as opacifiers in ceramics (low grade zirconia).

Now, in order to implement these and still further objects of the invention, which will become more readily apparent as the description proceeds, the metal oxides of the present invention are manifested by the features that they are obtainable by the method of the present invention.

The method for the production of a metal oxide of the present invention, is characterized in that at least one metal carboxylate (the salt of a metal with a carboxylic acid) is dissolved in a high enthalpy (usually >25 kJ/g) solvent comprising up to at most 40% of a carboxylic acid or a carboxylic acid mixture to form a solution, and wherein said solution is then formed into droplets and converted to nanoparticle by means of a high temperature process. Such metal carboxylates, also known as metal soaps, are generally used in large quantity as siccatives in resins, lacquers, as additives in polymer manufacturing, as fuel additives and in the fabrication of thin films. Some also find use as metal source for animal skin preservation. Therefore, such metal soaps are readily available, stable and readily processed, or they can be obtained by treating metal precursors with a suitable acid, obtionally and often preferably at higher temperature. Suitable metal precursors are those with anions that are easily replaced. Preferred anions are those that in protonated form are easily removable, such that no equilibrium can establish and the reaction proceeds to almost 100%, e.g. oxides, hydroxides, carbonates, halides, such as chlorides and bromides, and lower alkoxides.

Either pure (many of these metal soaps have a low melting point such that at enhanced temperature they have a sufficiently low viscosity) or dissolved in an additional solvent, such metal soaps are a highly suitable precursor for the manufacture of nanoparticles. Part of their most advantageous use is the fact that very high production rates can be used (in dissolved form, more than 100 g of ceria per liter of carrier liquid, or over 200 g zirconia per liter carrier liquid) which becomes a major problem in conventional preparation methods. There, solubility of the metal or high viscosity (difficult to spray) limit the production rates to low values (Mädler et al., 2002 achieved 26 g ceria per liter of precursor liquid). Oljaca et al. (2002) used less than 0.05 M solutions (corresponds to 8.6 g ceria or 6 g zirconia/h) while according to the invention above 1 M solutions can be made.

It has been found that using a precursor mix as disclosed in the scope of the present invention in FSP allows the production of pure and mixed oxides such as ceria, zirconia, gadolinia, titanates, manganates and stabilized zirconia at high production rate while preserving the beneficial properties of good mixing at atomic level, excellent specific surface area (e.g. good accessibility) and high phase stability.

A precursor or precursor mix, respectively, for FSP needs to carry sufficient metal(s) into a high temperature zone or preferably the flame, distribute said metal(s) within the high temperature zone or the flame and support a stable combustion or conversion and spray process. In the case of many metals such as for example cerium, this entails the following problems:

Few organometallic compounds are known, all organometallic compounds are rather expensive and/or contain other, undesired elements such as halogenes.

Cheap precursors are mainly water soluble. Water, however, is a very bad basis for FSP since it is cost and equipment intensive to achieve the necessary high temperature (plasma, laser, micorwaves, high dilutions).

The here disclosed process avoids these limitations.

BRIEF DESCRIPTION OF THE DRAWINGS

The invention will be better understood and objects other than those set forth above will become apparent when consideration is given to the following detailed description thereof. Such description makes reference to the annexed drawings, wherein.

On the right is a transmission electron microscope (TEM) picture of ceria/zirconia $Ce_{0.5}Zr_{0.5}O_2$ after thermal treatment at 700° C., 16 h, air, showing that such thermal treatment leads to larger particles of similar shape.

Figure 4:
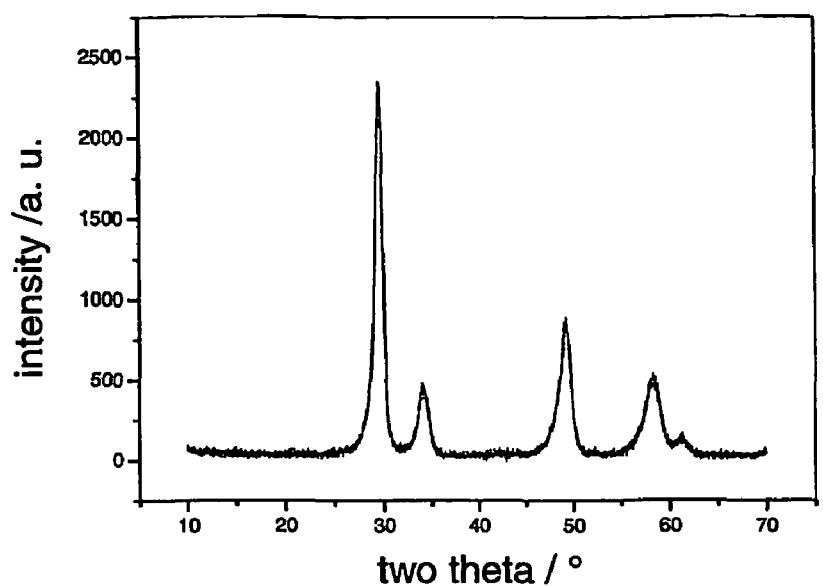

FIG. 4 shows an X-ray diffraction spectrum (XRD) diagram of CeZrO4 prepared from 0.4 M solutions of Ce and Zr.

Figure 5:
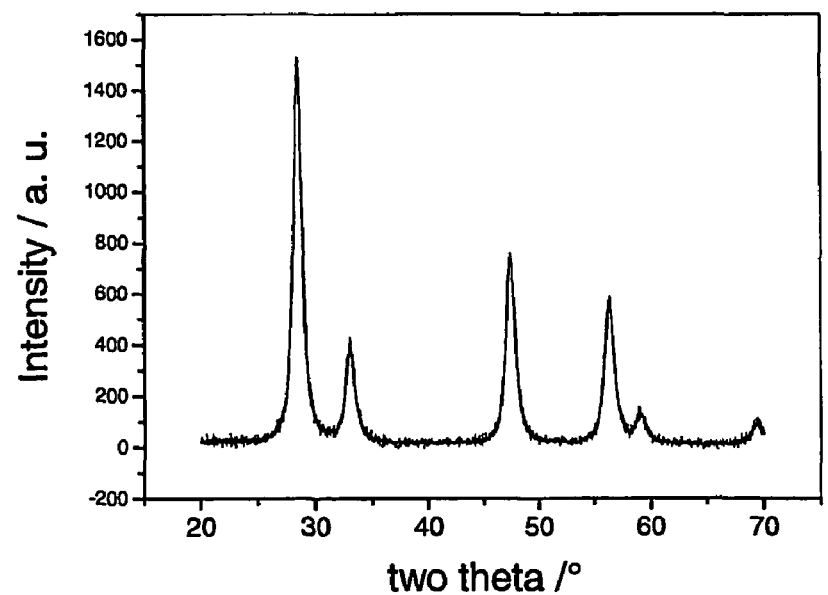

FIG. 5 shows the X-ray diffraction spectrum (XRD) of gadolinia doped ceria (Gd0.1Ce0.9O1.95; gadolinia/ceria) as prepared. It depicts the broad signals of very small crystals and confirms the excellent degree of mixing of the two metals and—by the clear peaks—it underlines the phase stability of the mixed oxide. It shows how different oxides can be delivered in the flame extremely homogeneously as to form a pure mixed oxide phase.

Figure 6:
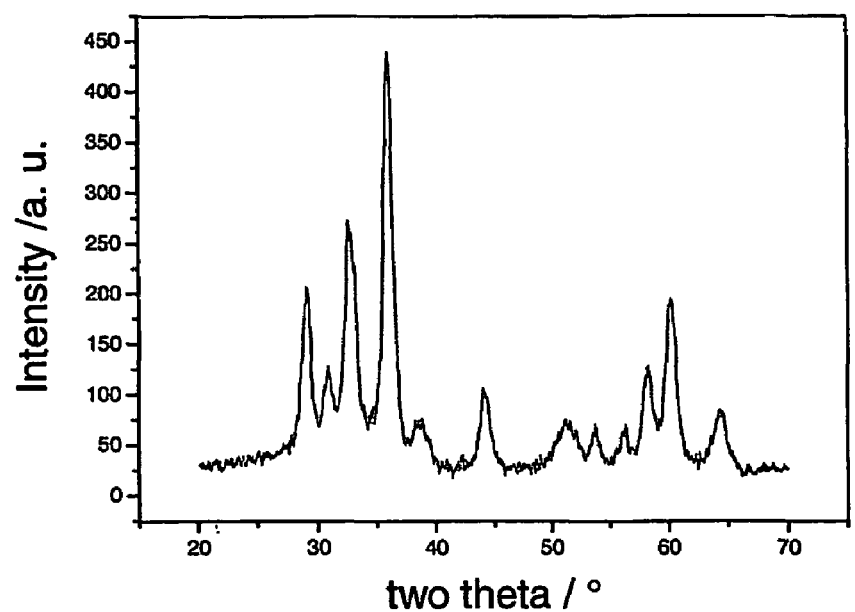

FIG. 6 depicts the XRD diagram of manganese oxide nanoparticles prepared from manganese naphthenate.

Figure 7:
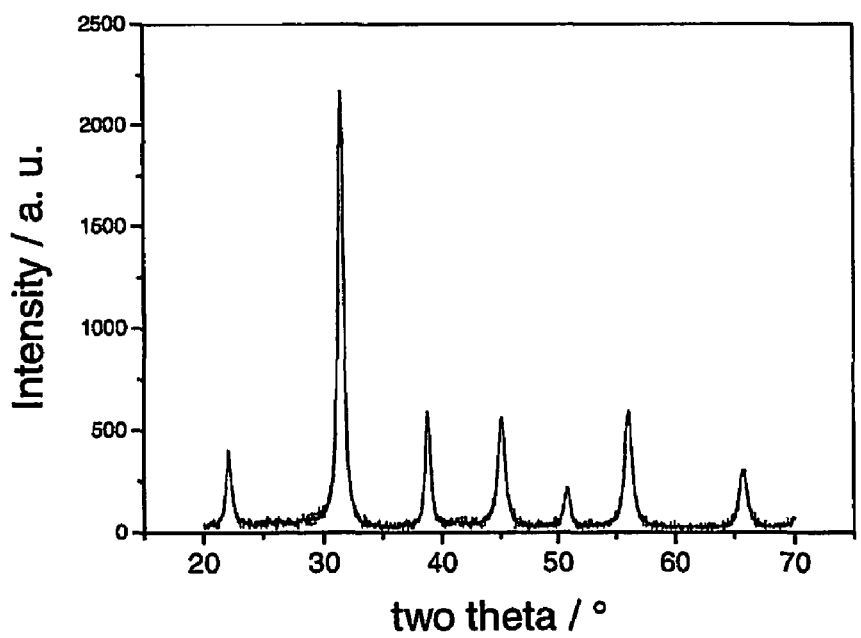

FIG. 7 is a XRD diagram of BaTiO3 prepared from barium and titanium precursors, dissolved in 2-ethylhexanoic acid, and with xylene as solvent. It confirms the identity of barium titanate nanoparticles by XRD.

Figure 8:
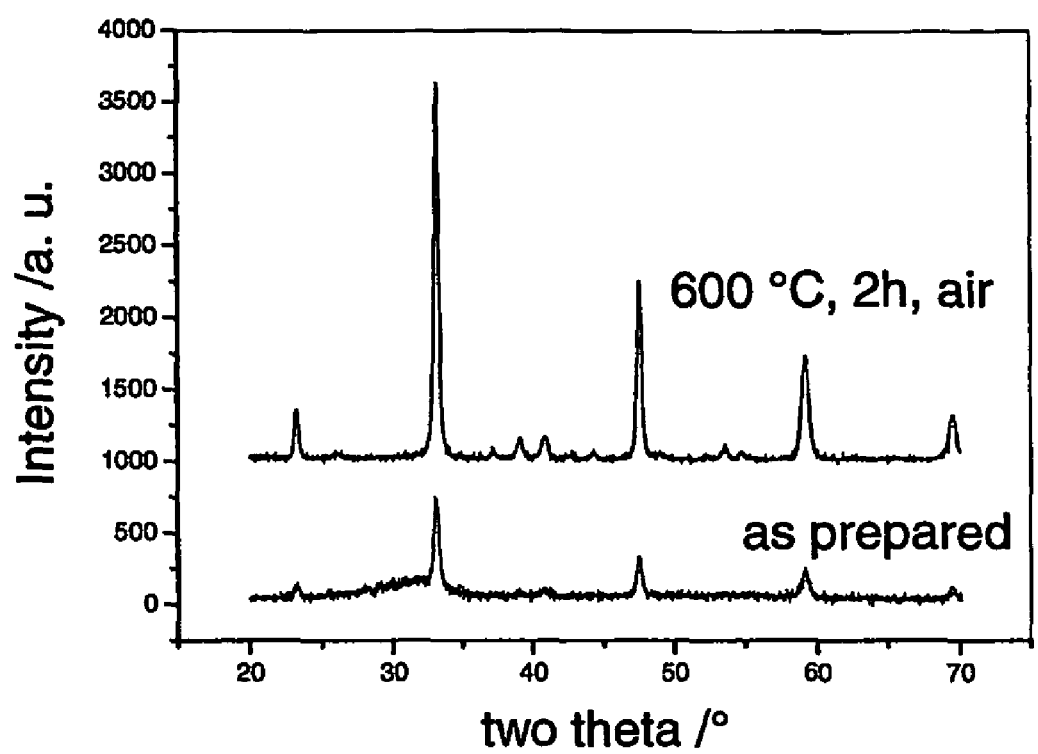

FIG. 8 is a XRD diagram of calcium titanate from calcium octoate and titanium octoate prepared from titanium tetra isopropoxide and 2-ethylhexanoic acid showing that calcium titanate can be obtained from calcium and titanium containing precursors that are converted into metal soaps. The low curve gives the XRD as prepared and the top gives the oxide after a sintering at 600° C., 2 h in air. A TEM image of the product is shown in FIG. 9.

Figure 9:
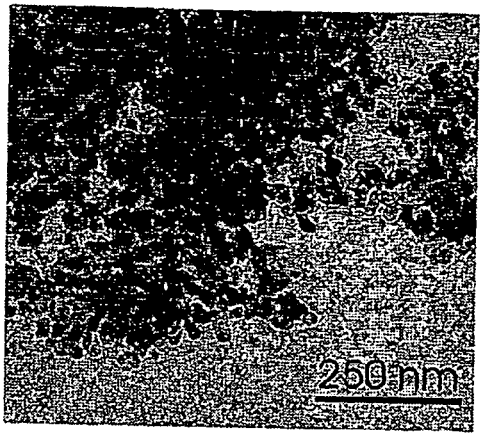
Figure 9:
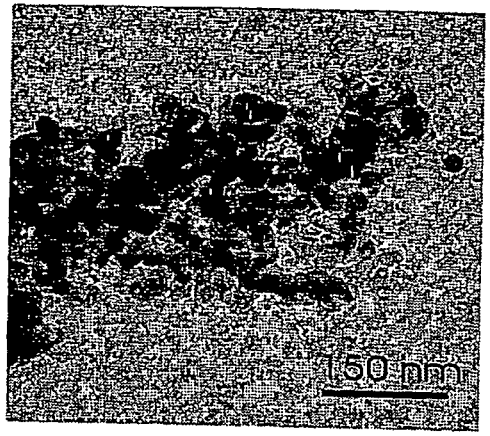

FIG. 9 gives TEM images of electronic materials prepared as in the experimental procedure. Left: LiMn2O4 particles for usage in battery storage materials, right: CaTiO3 for usage as dielectric or in other applications. In both materials, rather uniform particle size is observed, indicating a homogeneous particle formation throughout the reactor.

Figure 10:
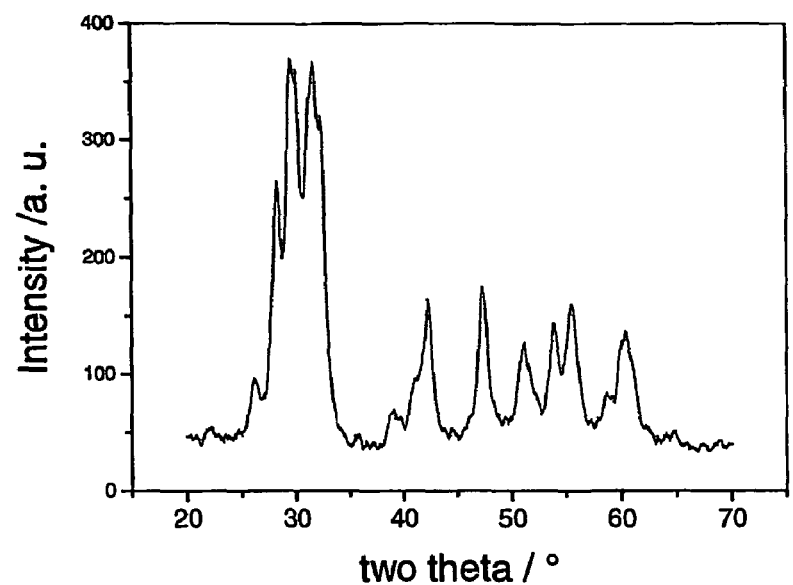

FIG. 10. is the XRD diagram of gadolinium oxide prepared from the corresponding gadolinium octoate in xylene/2-ethylhexanoic acid (10:1 by volume).

Figure 11:
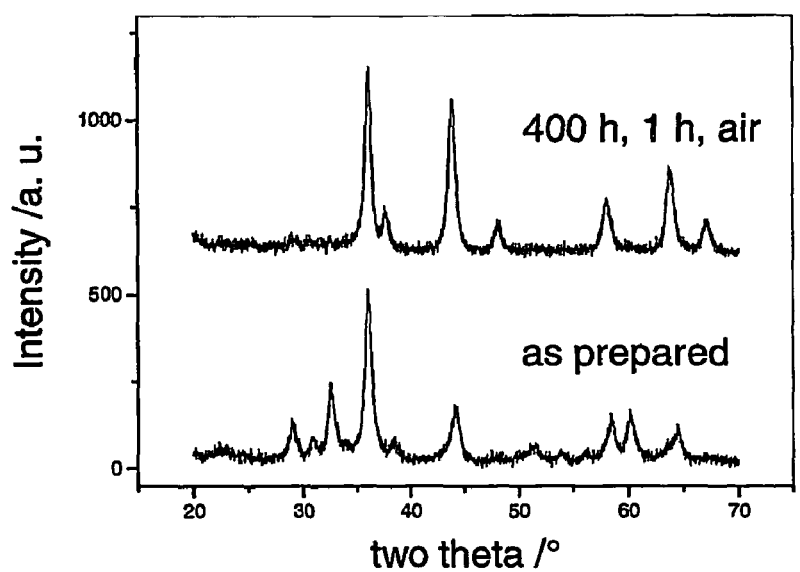

FIG. 11 gives the XRD diagram of lithium manganese oxide. The as prepared powder mainly consists of hausmannite and some amorphous parts. Heating to 400° C. is sufficient for the formation of the mixed oxide spinell phase.

MODES FOR CARRYING OUT THE INVENTION

The metal oxides of the present invention are obtainable by a method wherein at least one metal carboxylate ("metal soap") is used pure or dissolved and wherein said liquid is then formed into droplets and oxidized in a high temperature environment, in particular a flame.

The current invention uses metal carboxylates (salts of metals with one or several carboxylic acids) as a metal source for high temperature conversion to nanoparticle oxides, in particular flame spray synthesis. The metal soaps are used pure or dissolved in an additional solvent as to achieve a suitable viscosity.

In a much preferred embodiment of the inventive method the precursor liquid essentially consists of one or several metal soaps (presence of usual impurities of technical solvents is acceptable) pure or dissolved in a solvent. Optionally, these precursors may be heated prior to spraying. The liquids are characterized by a net heat of combustion of at least 13 kJ/g for some metals, preferably, and more generally applicable at least 18 kJ/g, more preferably at least 22.5 kJ/g, most preferably at least 25.5 kJ/g, and a viscosity of less than 100 mPas, preferably less than 50 mPas, most preferably less than 20 mPas. This is achieved by using pure metal soaps (optionally heated to elevated temperature that reduces their viscosity) or by dissolving metal soaps in an additional solvent with suitable viscosity and combustion energy.

In order to reduce the viscosity of the precursors it is often favorable to use a mix of a hydrocarbon such as toluene, xylene, hexane or light paraffin oil and a metal carboxylate where the corresponding carboxylic acids have a mean carbon number of at least 3 per carboxylate group as to ensure low viscosity, sufficient solubility and combustion energy. Preferred solvent mixes comprise metal soaps with a mean carbon number per carboxylate group of at least 4, more preferred of at least 5, in particular 5 to 8, whereby the carboxylic acid usually has not more than 30 C and preferably is selected from one or more C3 to C18 monocarboxylic acids, more preferred from one or more C4 to C12 carboxylic acids, and most preferred from one or more C5 to C8 carboxylic acids. Even though a higher mean carbon content than 8 can be used, such higher mean carbon content usually reduces the production rate.

Also suitable are chelating acids, such as dicarboxylic acids, polycarboxylic acids, amino carboxylic acids, hydroxy carboxylic acids, provided that they provide sufficient enthalpy or are compatible with the solvent optionally present to lower the viscosity and/or to enhance the enthalpy. Suitable carboxylic acids comprise linear or branched chain acids that can be saturated or unsaturated, and optionally further substituted as long as the substituents do not unduly affect the high enthalpy of the acid that preferably is at least 13 kJ/g, more preferably at least 18 kJ/g, much preferably at least 22.5 kJ/g and most preferably at least 25.5 kJ/g, or the melting point or the solubility of the metal soap. For many heavy metal oxides, metal soaps of 2-ethylhexanoic acid exhibit the desired properties and are well suited for flame spray synthesis. In other cases, such as the production of titanates, the metal soaps can be directly made in situ from a metal containing precursor by reaction with a carboxylic acid. Such solutions can be mixed with another metal soap and readily produce metal oxides, e.g. titanates such as calcium- and barium titanate. As already mentioned above, suitable metal precursors are in particular those with an anion that in protonated form can easily be removed, e.g. by heating, optionally under vacuum.

Beyond metal soaps with unsubstituted monocarboxylic acids, as already addressed above, other metal carboxylic acid salts can be applied as far as some limitations are observed. In this case it may be advantageous or even necessary to add an acid to the solvent in an amount of usually at most 40%. Dependent of the one or more acids derived anions of the metal soap, the one or more acid used as solvent can be linear or branched, saturated or unsaturated, unsubstituted or substituted monocarboxylic acids provided that they result in a suitable high enthalpy solvent. Such acids comprise acids with polar substituents such as —OH, —NH$_2$ or —CONH$_2$ groups that can be used to adjust the solvent to specific needs. In specific cases also sufficiently long chain optionally substituted saturated or unsaturated dicarboxylic acids or polycarboxylic acids can be used.

In many cases, however, no acid is needed or even disadvantageous. It has been found that metal carboxylates with higher mean carbon content, in particular salts with at least C4 monocarboxylic acids, preferably at least C5 monocarboxylic acids, are readily dissolved in apolar solvents with low molecular weight and/or low viscosity such as toluene, xylene, lower alkanes such as hexane, white spirits, but also light paraffin oil, ethers etc.

Presently preferred metal soaps are those with unsubstituted, linear or branched, saturated or unsaturated monocarboxylic acids, in particular C5 to C8 monocarboxylic acids such as e.g. 2-ethyl hexanoic acid, and preferred solvents are at least 60%, preferably at least 80%, much preferred almost 100% apolar solvents, in particular solvents selected from the group comprising toluene, xylene, lower or low viscosity alkanes, such as hexane, isooctane, lower or low viscosity alkenes, lower or low viscosity alkines, or mixtures thereof.

In yet another manifestation of the present invention, an oxide can be converted into nanoparticles by in situ forming the metal soap by treating the precursor, e.g. the oxide, hydroxide, halide, carbonate or alkoxide, at elevated temperature with the corresponding one or more carboxylic acids, eventually reducing viscosity by adding an additional solvent and oxidizing, in particular flame spraying the resulting mixture. The resulting oxide is made of nanoparticles of very narrow size distribution. Scheme 1 below outlines the procedure.

Scheme 1. The carboxy process for the conversion of an oxide into corresponding nanoparticles.

| Procedure | Example |
| --- | --- |
| Oxide | Gadolinium oxide (99%) |
| Make metalic soap | 66.6 g Gd2O3, 200 ml of 2-Ethylhexanoic acid, 35 ml acetic acid anhydride, reflux at 140° C. for 10 h, some acetic acid removed |
| Adjust viscosity | Dilute metal soap with xylene |
| Flame spray | Spray in a methane/oxygen flame as reported in the Experimental section |
| Collect nanoparticles | Gd2O3 nanoparticles with 70 m2/g surface area. |

In the inventive method, the flame or high temperature zone has a temperature of at least 600° C., usually at least 1200° C., preferably at least about 1600° C. A preferred range of the flame temperature for many applications is 1200 to 2600° C.

The average diameter of the droplets can vary depending on the liquid dispersion setup and the properties of the liquid itself. Usually, the average droplet diameter ranges from 0.1 μm to 100 μm, preferably from 1 μm to 20 μm. The droplet diameter is of minor importance if a here described precursor solution is applied. This is very advantageous as it allows for most conventional, commercially available oil-burners to convert the here described liquid into corresponding oxides. Suitable oil-burners are—to only mention a few—available from Vescal AG, Heizsysteme, Industriestrasse 461, CH-4703 Kestenholz under the designation of OEN-151LEV, or OEN-143LEV, or OEN-331LZ to OEN-334LZ.

Preferably, the droplets subjected to heat oxidation comprise the metal in concentrations of at least 0.15 moles metal per liter. Such concentrations lead to production rates of at least 0.15 moles metal or metal oxide per nozzle.

If the method of this invention is performed using a flame with insufficient oxygen for full conversion, such oxygen defficiency results in the formation of substoichiometric oxides or metals and mixtures thereof that have also their applications.

Furthermore, by adding a further step after the oxidation, the as produced metal oxides can be converted to the corresponding non-oxides such as nitrides, borides, carbides by means of an additional treatment, such as a treatment with ammonia, hydrogen, etc.

The method of the present invention can be used for the production of a broad range of metal oxides, in particular also mixed metal oxides. Further oxide systems that may be prepared by the inventive method, using specific carboxylic acids as solvent are e.g. pure transition metal oxides and mixed alkali or alkaline earth metal and transition metal oxides such as alkali metal manganates, especially lithium manganate or cobaltates, or calcium, strontium, barium titanates or zirconates and mixtures thereof, but also other oxides such as iron or manganese oxides.

Such oxides, in particular if prepared from pure precursors, have a high thermal stability that is characterized by a specific surface area (BET) of at least 20 m$^2$/g after sintering for 1 h at 600° C.

In contrast to impurity free pure of mixed metal oxides, oxides with impurites and superior features than hitherto known can be produced that usually have a specific surface area (BET) of at least 5 m$^2$/g after high temperature oxidation, preferably at least 10 m$^2$/g, in particular at least 15 m$^2$/g. Impurities allowing such surface areas are e.g. alkali metals, earth alkali metals, transition metals or rare earth metals, but also chlorides, fluorides or bromides, phosphates, sulfates or silicon and main group metals, such as Al, B etc., in the range of 0.5 to 5% per weight, in particular from 0.8 to 5% per weight.

A preferred metal oxide obtainable by the method of the present invention is characterized by a geometric standard deviation of the mass averaged primary particle size distribution smaller than 2 or with less than 2 wt % of solid primary particles with more than 500 nm in diameter and a specific surface area of more than 3 m$^2$/g. Such metal oxide particles are suitable for powder injection molding or optical lens polishing.

Much preferred metal oxides are zirconia stabilized with cerium and/or yttrium, preferably cerium or yttrium, in particular in an amount of cerium and/or yttrium of at most 20%.

Ceria based oxides in general and zirconia based oxides in general, but also LiNbO$_3$, BaTiO$_3$, SrTiO$_3$, CaTiO$_3$, Li$_x$MnO$_x$ and derivatives, NiO, Li$_x$TiO$_y$, apatite for medical implants, metal doped titania, rare earth metal oxides, especially lanthanum based perowskites, mixed oxides containing an element of the earth metal and from the transition metal group, mixed oxides containing an element from the alkali metals and the transition metals, aluminates, borates, silicates, phosphates, hafnia, thoria, uranium oxide, etc. with specific properties are obtainable. A series of representative examples is given in the experimental section.

The method of the present invention also encompasses the production of metal oxides starting from metal soaps that are combined with other precursors, in particular organometallic or organometalloide precursors, provided that the solubility and enthalpy stay within the herein outlined ranges. The as-prepared oxides may be subjected directly to an after-treatment in order to form nitrides, carbides, silicides, borides and others.

Suitable metals for the production of pure or mixed metal oxides are e.g cerium, zirconium, any rare earth metals, lithium, sodium, potassium, rubidium or caesium, magnesium, calcium, strontium, barium, aluminium, boron, gallium, indium, tin, lead, antimony, bismuth, scandium, yttrium, lanthanum, titanium, hafnium, vanadium, niobium, tantalum, chromium, molybdenum, tungsten, mangenese, rhenium, iron, ruthenium, osmium, cobalt, rhodium, iridium, nickel, palladium, platinum, copper, silver, gold, zinc, cadmium, thorium, uranium or silicon, whereby preferred mixed metal oxides are cerium with a rare earth or zirconium and/or alumina, zirconium with yttrium, scandium, aluminum or an alkali earth metal, titanium and an alkali or alkali earth metal, manganese, cobalt, nickel and iron in combination with lithium or another alkali metal, lithium and niobium, tungsten or molybdenum, barium with aluminium and platinum, aluminium with platinum or palladium, copper and aluminium or zirconium and zinc, lead and an alkali or earth alkali metal, tin and platinum, indium and tin or zinc, lanthanum and iron, manganese, cobalt or nickel, magnesium and aluminum.

A lot of cheap more or less pure metal chlorides are commercially available. Therefore, it is an advantage of this invention that a mixture of water free metal chlorides can be used as a metals source. Said mixture is then reacted with a carboxylic acid, and thereby formed hydrogen chloride is removed by degassing and/or heating the resulting solution. Such solution then can be used for the manufacture of oxides with a chloride content of less than 0.1% by weight.

The metal oxides of the present invention, in particular the mixed metal oxides, have the applications already known for them and an extended field of applications due to their improved properties.

Metal oxides of the present invention, such as e.g. ceria, zirconia or ceria/zirconia, due to their great homogeneity can be used for chemomechanical polishing, provided that they are of high purity.

Given the homogeneous particle structure, the oxides of the present invention are furthermore suitable for the manufacture of coatings, in structural ceramics or for protecting layers on metals.

The metal oxides of the present invention are in general e.g. usable as at least part of a catalytically active system, in particular for combustion engines, and/or for chemomechanical polishing, and/or as electrolyte or membranes in solid oxide fuel cells, and/or in batteries or in rechargable batteries, especially in Li ion batteries, and/or for at least one of the following purposes: as heterogenous catalysts, as NOx storage catalysts, as lubricant, as structural ceramics, as battery storage materials, for chemical sensors, for elements in energy production, for solar energy production elements, for electron storage in recyclable battery units, as dielectrics, as piezoelectrics, in micro-actuators, as ferroelectric, as gas permeable membranes, as pigments, polymer additives, stabilizers; magnetic fluids, polishing powders, additives in metal alloys, in armor fabrication, in microelectronics, as electrode raw material, as phosphors for radiation sensitive elements and in displays, in lasers, cosmetics, pharmaceutical packaging, additive in food and pharmaceutical applications, fuel cells, and/or superconductors.

One preferred use of ceria, and/or preferably ceria/zirconia having a monolithic structure as obtainable according to the present invention is as a catalyst. For such catalyst, the ceria and/or the ceria/zirconia can be mixed with monolithic structure giving material such as $Al_2O_3$. The ceria and/or ceria/zirconia can e.g. be a layer covering a monolithic structure carrier.

Such catalyst may furthermore comprise additional catalytically active substances such as further metal oxides, •e.g. titania, vanadia, chromia, manganese, iron, cobalt, nickel, copper oxides, and/or noble metals, e.g. platinum, palladium, rhodium, ruthenium, rhenium, iridium, all of them alone or in admixture with one or more thereof, or alloys thereof. A preferred catalyst is platinum/ceria/zirconia.

EXAMPLES

General Procedure

Figure 1:
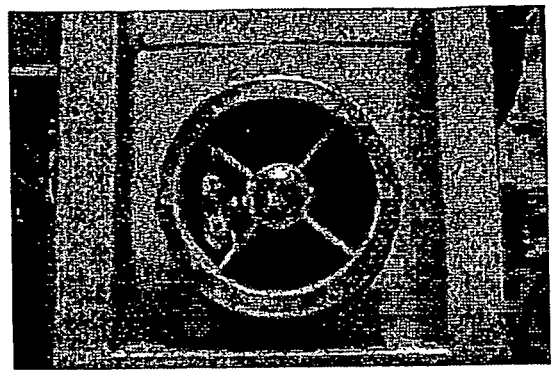
FIG. 1 shows a conventional oil burner (dispersion nozzle) with guiding tube removed top view. The middle consists of a 2-phase nozzle where the oil or, in this case, metal containing liquid is dispersed. The sectionned channel delivers air to support the combustion.
Figure 2:
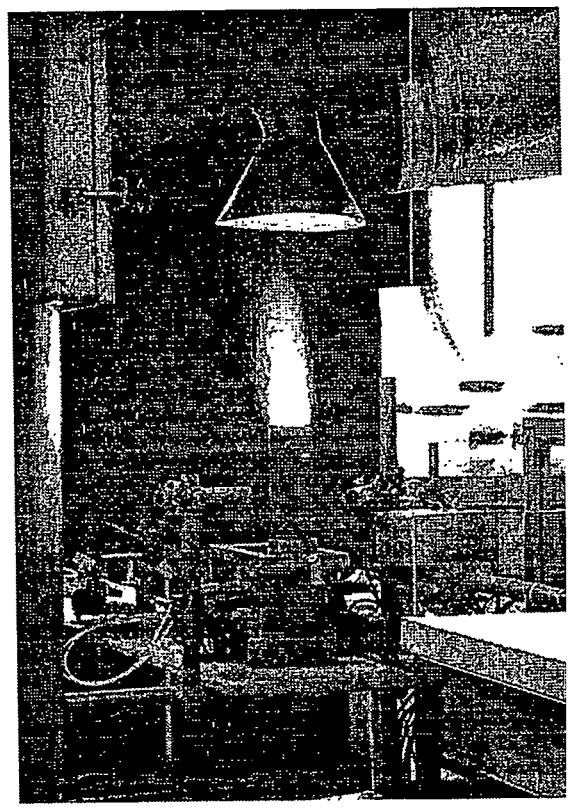
FIG. 2 shows a conventional oil burner producing calcia stabilized zirconia nanoparticles at 540 g/h.
Figure 3:
FIG. 3 shows transmission electron microscopy images of ceria/zirconia (CeZrO4) prepared from a 0.4 M solution of Ce and Zr (each 0.4 M). On the left is a transmission electron microscope (TEM) picture of ceria/zirconia $Ce_{0.5}Zr_{0.5}O_2$ as prepared by using a production rate of 118 g/l of carrier liquid.
Figure 3:
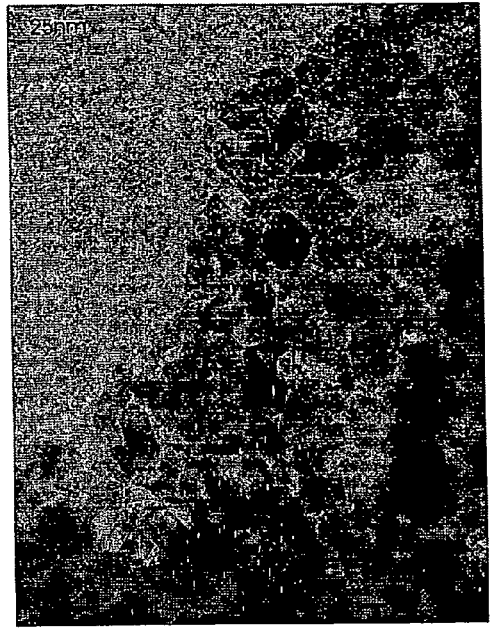

Mixed oxide powders were produced by flame spray pyrolysis in a laboratory scale setup [Mädler et al. (2002A), FIG. 1] or a pilot-scale oil-burner (SYSTHERM, CH-8105 Regensdorf, Typ NS1, Ausführung 1.1, 1988, Nr. 20940; Control unit (Satronic Type ZT801 and MMD 870; Flicker detector (Satronic IRP 1010); Burner tube length: 0.23 m, diameter: 0.0825 m; 720 l of air/hour as dispersion gas, 3 liter of liquid per hour, FIGS. 1 and 2).§ The following describes a standard preparation later denoted as (3/3). Metal containing liquids are brought into the flame by a syringe pump (Inotech IR-232) at 3 ml/min. The flame consists of a central spray delivery, a premixed, circular support flame (diameter 6 mm, slit width 150 μm) and a circular sheet gas delivery (ring of sinter metal, inner diameter 11 mm, outer diameter 18 mm, 5 l oxigen/min.). Oxygen (Pan Gas, 99.8%) was used as a dispersion gas in all experiments and delivered at 3 l/min. A mixture of methane (1.5 l/min, Pan Gas, 99%) and oxygen (3.2 l/min) was fed to the inner slit and formed a premixed flame. All gas flow rates were controlled by calibrated mass flow controller (Bronkhorst EL-Flow F201).

Preparation of Metal Containing Precursors

Corresponding amounts of metal soaps are dissolve in xylene, toluene, petroleum, light paraffin oil or other suitable solvents. Optionally, some carboxylic acid is added. The following gives a series of preparations with specific substances.

Production of Iron or Manganese Oxide Nanoparticles

Iron oxide. 10 ml of iron naphthenate (Strem Chemicals, CAS no. [1338-14-3], LOT no. 138222-S, 80% in mineral spirits, 12 wt % iron) are mixed with 10 ml of xylene resulting in a dark red solution. Spraying this precursor at 3 ml/min (same experimental parameters as in the ceria/zirconia experiments) in a methane/oxygen spray flame results iron oxide nanoparticles with a BET specific surface area of 71 $m^2/g$. Production rate: 85 g iron oxide/liter precursor liquid.

Manganese oxide. 10 ml of manganese naphthenate (Strem Chemicals, CAS no. [1336-93-2], LOT no. 124623-S, 56% in mineral spirits, 6.0 wt % Mn) are mixed with 10 ml of xylene and flame sprayed at the same conditions as for the iron oxide. The corresponding specific surface area yields 80 $m^2/g$ and X-ray diffraction confirms the formation of $Mn_3O_4$ as a major component. Production rate: 42 g manganese oxide/liter precursor liquid.

Lithium manganese spinell. A solution of 0.75 M manganese naphthenate and 0.375 M lithium octoate is sprayed at (3/3) in a oxygen/methane flame. The product is kept at 400° C., in air for 1 h. XRD confirms the formation of the spinell phase with a specific surface area of 91 m2/g. Narrow particle size distribution is confirmed by TEM (see FIG. 9).

Calcium titanate. 20 ml of a 1.24 M Ca octoate solution (in white spirit/2-ethylhexanoic acid) and 7.4 ml of titanium tetra isopropoxide are mixed. The solution warms up as the isopropanol is replaced by the stronger acid group. The solution is then diluted by two volumes of xylene and sprayed at (3/3) resulting a white powder. XRD confirms formation of calcium titanate (see FIG. 8) with a specific surface area of 60 $m^2/g$. Calcination at 600° C., 1 h, air results in 45 $m^2/g$.

Barium titanate. 10 ml of a 0.5 M barium octoate solution (2-ethylhexanoic acid/toluene) and 1.51 ml of titanium are mixed. After cooling down, 5 ml of toluene are added to reduce the viscosity. Spraying at (3/3) results a pure white powder. Raw material is rather amorphous, but keeping it at 600° C., 1 h in air results a pure barium titaniate phase (XRD) with specific surface area of 36 $m^2/g$.

Production of Calcia Stabilized Zirconia

Laboratory scale. 3.5 ml of zirconium (IV) octoate (technical grade, SocTech SA, Bucharest, Rumania, CAS no. [18312-04-4], 16 wt % zirconium), 8.5 ml of 2-ethylhexanoic acid, 5.5 ml of toluene and 0.5 ml of calcium octoate (technical grade, SocTech SA, Bucharest, Rumania, CAS nr [242-197-8], 5.2 wt % calcium) are mixed and sprayed using the standard parameters. The as-prepared powder has a specific surface area of 62 m$^2$/g, sintering in air (16 h at 700° C., ramp at 5° C./min) reduces it to 19 m$^2$/g.

Pilot scale (first, not optimized trial). Spraying a mixture of 2 kg zirconium (IV) octoate (technical grade, SocTech SA, Bucharest, Rumania, CAS no. [18312-04-4], 16 wt % zirconium), 0.66 liter light paraffin oil and 0.225. liter of calcium octoate (technical grade, SocTech SA, Bucharest, Rumania, CAS no. [242-197-8], 5.2 wt % calcium) at 3 kg/h in a larger burner (see General Procedure) results a white, homogeneous powder with 24.5 m$^2$/g. Production rate: 180 g/liter precursor.

Production of Ceria and Ceria/Zirconia

Laboratory scale. For ceria, 10.5 ml of cerium (III) octoate (SocTech SA, Bucharest, Rumania, technical grade, CAS no. [56797-01-4], 10.2 wt % cerium, contains 0.14 wt % Na) are diluted with 5.5 ml toluene and 2 ml 2-ethylhexanoic acid. Spraying using the standard parameters results in 67 m$^2$/g and 10 m$^2$/g after sintering in air (16 h at 700° C., ramp at 5° C./min). Spraying high grade precursors results in much higher stability as discussed in the Results part.

Pilot scale (first, not optimized trial). Spraying a mixture of 0.75 kg cerium (III) octoate (SocTech SA, Bucharest, Rumania, technical grade, CAS nr [56797-01-4], 10.2 wt % cerium, contains 0.14 wt % Na) and 0.275 liter light paraffin oil at 3 kg/h in a larger burner (see General Procedure) results a slightly yellowish, homogeneous powder with 18 m$^2$/g after sintering in air (16 h at 700° C., ramp at 5° C./min) 4 m$^2$/g. Production rate: 90 g/liter precursor.

Laboratory scale. For ceria/zirconia 10.5 ml of cerium (III) octoate (SocTech SA, Bucharest, Rumania, technical grade, CAS no. [56797-01-4], 10.2 wt % cerium, contains 0.14 wt % Na) and 3.5 ml of zirconium (IV) octoate (SocTech SA, Bucharest, Rumania, CAS no. [18312-04-4], 16 wt % zirconium) are diluted with 4 ml toluene. Spraying using the standard parameters results in 69 m$^2$/g and 28 m$^2$/g after sintering in air (16 h at 700° C., ramp at 5° C./min). Even using this technical quality precursors, the effect of stabilization is clearly visible.

Pilot scale (first, not optimized trial). Spraying a mixture of 2.5 kg of cerium (III) octoate (SocTech SA, Bucharest, Rumania, technical grade, CAS no. [56797-01-4], 10.2 wt % cerium, contains 0.14 wt % Na), 0.833 kg zirconium (IV) octoate (SocTech SA, Bucharest, Rumania, CAS no. [18312-04-4], 16 wt % zirconium) and 0.833 l toluene at 3 kg/h in a larger burner (see General Procedure) results a slightly yellowish, homogeneous powder with 21 m$^2$/g after sintering in air (16 h at 700° C., ramp at 5° C./min) 14 m$^2$/g. Production rate: 125 g/liter precursor.

Results and Discussion

The Importance of Viscosity

As the metal carrier liquid is dispersed into small droplets during spraying, viscosity has to be sufficiently low as to allow good liquid distribution. The following Table 1 illustrates in what range the liquid viscosity is appropriate for flame spray synthesis.

TABLE 1

| Metal carrier liquid | Viscosity/ mPa s | Suitable for flame spray if at 298 K |
|---|---|---|
| Iron naphthanate 80% in white spirit | >100 | no |
| Ditto, diluted with xylene (1:1) | 3 | yes |
| Manganese naphthenate 56% in white spirit | 16 | yes |
| Ditto, diluted with xylene (1:1) | 1.7 | yes |

TABLE 1-continued

| Metal carrier liquid | Viscosity/ mPa s | Suitable for flame spray if at 298 K |
|---|---|---|
| 0.4 M cerium, 0.4 M zirconium in 2-Ethylhexanoic acid/Toluene (5:2 by volume) | 5 | yes |
| Zirconium octoate (16 wt % Zr) in white spirit | >100 | no |
| Ditto, diluted with xylene (3:1) | 10 | yes |
| Ditto, diluted with dodecane (3:1) | 19 | yes |
| Cerium octoate (10.2 wt % cerium) in white spirit, diluted with xylene (3:1) | 22 | yes |
| Ditto, diluted with dodecane (3:1) | >40 | dependent on burner |

Note:
Viscosity measured in a rheometer (Haake VT 550 Rheometer, Fisons, Digitana AG, 8810 Horgen) at ambient temperature Diluting metal carboxylates with other solvents shows the colligative properties of these solutions. Xylene reduces the viscosity about twice as good as dodecane for both cerium and zirconium precursors.

As an alternative to dissolution, or in addition thereto, heating of the metal carboxylate or the metal carboxylate comprising mixture/solution can be provided, in order to further lower the viscosity to preferably beyond 40 mPa s.

The Importance of Material Purity on Thermal Stability

As additional elements, sodium or chloride form the manufacturing process of the carboxylate salts of metals, have a significant influence on the final product stability, a comparison is given form precursors of high purity (>99% metal content) and technical grades (below 99% metal, contains chloride and mainly sodium). A large drop in stability after sintering becomes most apparent for ceria where sodium in the technical precursor increases its sintering rate. A cross experiment with pure cerium octoate and an additional 1 wt % sodium resulted in a similar loss in specific surface area as in the case of the technical grade precursors. The results are shown in Table 2 below.

TABLE 2

|  | grade | SSA as prepared [m$^2$ g$^{-1}$] | SSA sintered [m$^2$ g$^{-1}$] | Prod. Rate [g l$^{-1}$] |
|---|---|---|---|---|
| Ceria | 99.8% | 125 | 71 | 69 |
| " | Tech. | 67 | 10 | 69 |
| Ceria, 1 wt % Na | | — | 24[a] | — |
| Zirconia | >99% | 105 | 45 | 50 |
| " | Tech. | 121 | 24 | 50 |
| Ceria/zirconia | >99% | 94 | 83 | 59 |
| " | Tech. | 69 | 28 | 59 |

Note:
Technical grades contain sodium and chloride amongst others.
[a]Pure, flame made ceria is impregnated with sodium hydroxide (1 wt % Na$_2$O in final ceramic) and subjected to sintering.
grade: purity based on metals only The Range of Accessible Materials The given examples show that single transition metal oxides can be prepared with above 60 m$^2$/g specific surface area while maintaining production rates of more than 40 g/h. Such materials find applications in a wide range of products and processes. Electronic materials, batteries, ferroelectrica, permanent magnets, coils, and magnetic fluids are just a few.

The given examples further show that an alcaline or earth alcaline metal can be combined with a transition metal oxide to form the corresponding mixed oxides. Such materials can form spinells, perovskites and other interesting phases. They find applications as dielectric, piezoelectics, actuators, in membranes, as sensors, in capacitors, superconductors and others. Some are used as catalysts, as ceramics for high temperature applications or structural ceramics.

Material Homogeneity

Transmission electron microscopy images of lithium manganate, calcium titanate or ceria/zirconia show that nanoparticle with a narrow range of particle sizes can be obtained by the here described method. This is further supported by X-ray diffraction pattern that would show the formation of large crystallites. Specific surface area, furthermore supports the particle size range as observed by TEM. This data clearly show that the present invention can be used for the manufacture of nanoparticles.

CONCLUSIONS

The carboxy process offers a readily accessible way to nanoparticle production. Using metal soaps as main precursors even conventional oil burners may be used to synthesize nanoparticles. Particles of transition metal oxides, mixed oxides from elements from the alkali metal, alkaline earth metal, rare earth metal and transition metal series amongst them have been made showing the versatility of the process. Handling, storage and mixing compatibility of such metal soap based liquids are combined with high production rate. Enabling over 200 g of nanoparticles to be produced from 1 liter of precursor liquids while being rather insensitive to the type of burner, dispersion gas system or flame type makes these precursors very advantageous over any other metal delivery system for flame spray synthesis.

Even technical precursors may be used but consequently result in much lower thermal stability. A proof of this effect was made by doping sodium into a pure ceria precursor (see Table 2).

While there are shown and described presently preferred embodiments of the invention, it is to be distinctly understood that the invention is not limited thereto but may be otherwise variously embodied and practiced within the scope of the following claims.

REFERENCES

Laine, R. M., Hinklin, T., Williams, G., Rand, S. C.; Low Cost Nanopowders for Phosphor and Laser Applications by Flame Spray Pyrolysis, *J. Metastable Nanocryst. Mat.*, 2000, 8, 500

Aruna, S. T., Patil, K. C.; Combustion Synthesis and Properties of Nanostructured Ceria-Zirconia Solid Solutions, *NanoStructured Materials*, 1998, 10, 955

Laine, R. M., Baranwal, R., Hinklin, T., Treadwell, D., Sutorik, A., Bickmore, C., Waldner, K., Neo, S. S.; Making nanosized oxide powders from precursors by flame spray pyrolysis, *Key. Eng. Mat.*, 1999, 159, 17

Yoshioka, T., Dosaka, K., Sato, T., Okuwaki, A., Tanno, S., Miura, T.; Preparation of spherical ceria-doped tetragonal zirconia by the spray pyrolysis method, *J. Mater. Sci. Lett.*, 1992, 11, 51.

Oljaca, M., Xing, Y., Lovelace, C., Shanmugham, S., Hunt, A., Flame Synthesis of nanopowders via combustion chemical vapor deposition, J. Mater. Sci. Lett., 21, 621-626 (2002).

Maric, R., Seward, S., Faguy, P. W., Oljaca, M., Electrolyte Materials for Intermediate Temperature Fuel Cells Produced via Combustion Chemical Vapor Condensation, Electrochemical and Solid State Letters, 6 (5) A 91 (2003).

Mädler, L., Kammler, H. K., Mueller, R., S. E. Pratsinis; Controlled synthesis of nanostructured particles by flame spray pyrolysis, *Aerosol Science*, 2002A, 33, 369

Mädler, L., Stark, W. J., Pratsins, S. E., Flame-made Ceria Nanoparticles, *J. Mater. Res.*, 2002B, 17, 1356.

W. J. Stark, L. Mädler, M. Maciejewski, S. E. Pratsinis, A. Baiker, Flame-Synthesis of Nanocrystalline Ceria-Zirconia: Effect of Carrier Liquid, *Chem. Comm.*, 2003, 588-589.

The invention claimed is:

1. A method for manufacturing a metal oxide or a mixed metal oxide, said oxide being in the form of nanoparticles, wherein at least one metal precursor is contained in a precursor solution which is formed into droplets and the at least one metal precursor is oxidized in a flame, characterized in that
   a) said at least one metal precursor is a metal 2-ethyl hexanoate;
   b) said precursor solution, prior to being formed into droplets, has a viscosity of at most 100 mPas;
   c) said precursor solution is
      i) heated to obtain such viscosity or
      ii) mixed with at least one viscosity reducing solvent, said solvent is at least 60% apolar;
   d) said flame oxidation is performed in a spray burner that comprises nozzles;
   e) said precursor solution comprises at least 0.15 moles metal per liter of the precursor solution; and
   f) at least 0.15 moles of a metal oxide or a mixed metal oxide per nozzle and per liter of the precursor solution are produced, wherein the metal or metals in the metal oxide or the mixed metal oxide is/are selected from the group consisting of zirconium, lithium, sodium, potassium, rubidium, cesium, magnesium, calcium, strontium, barium, aluminum, boron, gallium, indium, tin, lead, antimony, bismuth, titanium, hafnium, vanadium, niobium, tantalum, chromium, molybdenum, tungsten, mangenese, rhenium, iron, ruthenium, osmium, cobalt, rhodium, iridium, nickel, palladium, platinum, copper, silver, gold, zinc, cadmium, thorium, uranium and silicon.

2. The method of claim 1, wherein the solvent is free of acid.

3. The method of claim 1, wherein the solvent comprises at least one low molecular weight and/or low viscosity apolar solvent selected from the group consisting of toluene, xylene, lower aliphatic hydrocarbons and mixtures thereof.

4. The method of claim 1, wherein the mixed metal oxide contains a combination of metals selected from the group consisting of zirconium in combination with aluminum or an alkali earth metal; titanium in combination with an alkali or alkali earth metal; manganese, cobalt, nickel and iron in combination with an alkali metal; lithium in combination with niobium, tungsten or molybdenum; barium in combination with aluminum and platinum; aluminum in combination with platinum or palladium; copper in combination with aluminum or zirconium and zinc; lead in combination with an alkali or alkali earth metal; tin in combination with platinum; indium in combination with tin or zinc; and magnesium in combination with aluminum.

5. The method of claim 1 wherein the oxidation is performed at a temperature of at least 600° C.

6. The method of claim 1 wherein the metal precursor is prepared starting from a metal oxide, a metal hydroxide, a metal carbonate, a metal halide or a metal lower alkyl oxide.

7. The method of claim 1, wherein a net heat of combustion of the metal precursor is at least 13 kJ/g.

8. The method of claim 1, wherein the metal precursor comprise impurities of one or more elements of the group comprising alkali metals, alkaline earth metals, transition metals, rare earth metals, chlorides, fluorides, bromides, phosphates, sulfates, silicon, and main group metals, whereby the impurites are present in amounts in the range of 0.5 to 5% by weight.

9. The method of claim 1, wherein the metal oxide is a sub-stoichiometric oxide and wherein said metal oxide is produced in a flame with insufficient oxygen for full conversion.

10. A method of claim 1 wherein one or more water free metal chlorides are used as a metals source, said metals source is reacted with a 2-ethyl hexanoic acid such that hydrogen chloride is generated and is subsequently removed, whereby the precursor solution containing at least one metal precursor is obtained that is suitable for the manufacture of oxides with a chloride content of less than 0.1% by weight.

11. The method of claim 1 wherein said viscosity reducing solvent is almost 100% apolar.

12. The method of claim 1 wherein said viscosity reducing solvent is selected from the group consisting of toluene, xylene, hexane, isooctane, or mixtures thereof.

13. The method of claim 1 wherein said metal precursor is heated to obtain said viscosity.

14. The method of claim 1 wherein the metal or the combination of metals in said at least one metal precursor is selected from the group consisting of zirconium, titanium, iron, manganese, lithium, calcium, barium and mixtures thereof.

15. The method of claim 1 wherein the metal in said at least one metal precursor is zirconium.

* * * * *